United States Patent [19]

Cazzaro et al.

[11] 4,285,900

[45] Aug. 25, 1981

[54] PROCESS FOR MANUFACTURING MODACRYLIC FIBERS HAVING HIGH LUSTER, THERMAL STABILITY AND FLAME RESISTANCE

[75] Inventors: Giorgio Cazzaro, Saronno; Antonino Cavallaro, Cesano Maderno; Antonio Salan, Saronno; Giancarlo Matera, Monza, all of Italy

[73] Assignee: Snia Viscosa Societa' Nazionale Industria Applicazioni Viscosa S.p.A., Milan, Italy

[21] Appl. No.: 125,236

[22] Filed: Feb. 27, 1980

[30] Foreign Application Priority Data

Mar. 9, 1979 [IT] Italy ............................... 20850 A/79

[51] Int. Cl.$^3$ .............................................. D01F 6/18
[52] U.S. Cl. ........................... 264/182; 260/29.6 AQ; 260/32.6 N; 260/42.48
[58] Field of Search .............. 260/29.6 AN, 29.6 AB, 260/29.6 AQ, 34.2, 42.48, 32.6 N; 264/182, 24

[56] References Cited

U.S. PATENT DOCUMENTS

| | | | |
|---|---|---|---|
| 2,941,970 | 6/1960 | Craig | 260/34.2 |
| 3,410,819 | 11/1968 | Kourtg et al. | 260/29.6 AQ |
| 3,773,884 | 11/1973 | Shimosaka et al. | 260/29.6 AN |
| 3,852,401 | 12/1974 | Suzuki et al. | 264/182 |
| 4,077,929 | 3/1978 | Robinson | 260/29.6 AN |
| 4,169,876 | 10/1979 | Irwin | 264/24 |

FOREIGN PATENT DOCUMENTS 52-8126  1/1977  Japan ....................... 264/182

*Primary Examiner*—Jay H. Woo
*Attorney, Agent, or Firm*—Wenderoth, Lind & Ponack

[57] ABSTRACT

A method for preparing flame-resisting modacrylic fibers containing pentavalent antimony oxide is described wherein the antimony oxide is suspended in a mixture of water and an organic solvent selected from dimethylformamide and dimethylacetamide and the suspension is then mixed with the viscose solution of the modacrylic polymeric material to be spun. The process yield high luster, flame-resisting modacrylic fibre of the "L.O.I. uprated" type.

6 Claims, No Drawings

PROCESS FOR MANUFACTURING MODACRYLIC FIBERS HAVING HIGH LUSTER, THERMAL STABILITY AND FLAME RESISTANCE

BACKGROUND OF THE INVENTION

This invention relates to a method of preparing modacrylic fibers, that is fibers which are composed of polymers containing 50 to 85% by weight of acrylonitrile units in their molecule, exhibiting a high lustre, high stability towards thermal treatments, and high resistance to flame.

Known are several methods for preparing fibers with essentially the above features, in particular the processes described in copending Italian Patent Applications Nos. 28980 A/76 and 27997 A/77 by this same Applicant. Such processes comprise the steps of admixing in suitable ratios a binary copolymer resulting from the copolymerization of acrylonitrile (ACN) and vinylidene chloride (VDC) with a polymer obtained from copolymerization of acrylonitrile and a suitable sulphonic derivative, perferably a derivative of the alkylacrylamidoalkane-sulphonic series. With these methods, a fiber is obtained which is characterized by a limiting oxygen index (L.O.I.) equal to at least 26% or more of oxygen.

This invention is preferably applied in conjunction with a method, such as the one described in the cited copending Applications; however, the invention is not restricted to that application, as it may also be applied, as a rule, to different processes and the resulting different modacrylic ploymers.

It is known that the flame resistance of a halogenated modacrylic fiber can be improved through the addition of antimony oxides. However, the addition of a trivalent antimony oxide to the fiber in the amounts required to achieve flame-resisting properties produces a highly opaque or matt fiber.

To solve the problem of the obtainment of a flameproof modacrylic fiber, of the so-called "L.O.I. uprated" type, but having unaltered lustre characteristics, several solutions have been proposed in the art. For example, it has been proposed that organic derivatives of antimony be prepared which are soluble in commonly used spinning solvents, but this approach involves difficulties of preparation and high costs. Also proposed has been the utilization of pentavalent antimony oxides ($Sb_2O_5$) in particle sizes smaller than 100 millimicrons, i.e. smaller than the wavelength of light, therefore they cannot function as diffraction nuclei and consequently do not modify the lustre characteristics of the resulting fiber.

Moreover, the addition of antimony pentoxide to the spinning solution or "dope" poses considerable technical difficulties. In practice, the only known way of using it is that of suspending it in water or a specially provided organic carrier and adding the resulting suspensions to the spinning dope. However, this approach introduces considerable problems, such as coagulation phenomena, solution instability, etc.

SUMMARY OF THE INVENTION

This invention sets out to provide a method which can obviate such drawbacks and affords the possibility of utilizing acqueous colloidal suspensions of pentavalent antimony oxide of suitable granulometry, preferably with particles smaller than 100 millimicrons, to obtain a fiber of increased resistance to flame and high lustre, without problems.

According to the invention, the antimony pentoxide is suspended in a mixture of water and an organic solvent selected from dimethylformamide (DMF) and dimethylacetamide, with a water content of at least 20% but no higher than 40%; the resulting suspension is then hot dispersed, preferably at temperatures in the 60° to 95° C. range, in the spinning dope. Preferably, the organic solvent is the same as used in the dope.

Such suspensions are time stable, and their additivation to the dope creates no problems, such as the formation of coagula, even when concentrated up to 23-27% of solids.

DESCRIPTION OF THE PREFERRED EMBOIDMENTS OF THE INVENTION

The invention will be more clearly understood by making reference to the following not limitative, embodiments thereof.

Two binary copolymers are preapred, which will be designated as A and B, the former from acrylonitrile (ACN) and a sodium salt of 2-acrylamido-2-propane sulphonic acid, having the formula $CH_2=CH-CONH-C(CH_3)_2-CH_2-SO_3Na$, which will be designated hereinafter as "SAMPS" for simplicity, the latter from ACN and vinylidene chloride. The preparation conditions for these polymers, and the preparation of the spinning dope therefore are as follows:

(a) Composition by weight of the polymerization mixture:

| Copolymer Type | A | B |
| --- | --- | --- |
| ACN (%) | 27.20 | 24.75 |
| SAMPS (%) | 4.80 | — |
| $CH_2=CCL_2$ (%) | — | 20.25 |
| $H_2O$ (%) | 2.00 | 6.00 |
| DMF (%) | 66.00 | 49.00 |
| Total percent of monomers in the mixture | 32 | 45 |

(b) Percent by weight of the various comonomers included in the respective polymerization mixtures:

| Copolymer Type | A | B |
| --- | --- | --- |
| ACN (%) | 85 | 55 |
| $CH_2=CCl_2$ (%) | — | 45 |
| SAMPS (%) | 15 | — |

(c) Conditions for polymerization:

| Copolymer Type | A | B |
| --- | --- | --- |
| Temperature (°C.) | 67° | 52° |
| Duration (hours) | 11 | 13 |
| AIBN (azoisobutyronitrile) catalyst (%) | 0.027 | 0.2 |
| Stabilizer (%) | 0.015 | 0.1 |

(d) Characteristics of the mixture upon completion of the polymerization:

| Copolymer | A | B |
| --- | --- | --- |
| Solids (%) | 21 | 19.1 |
| Conversion percent of monomers into polymer | 65.6 | 42.4 |
| Conversion percent of SAMPS into copolymer | 65.6 | — |

(e) Composition of the polymer:

| Copolymer | A | B |
| --- | --- | --- |
| ACN (% by weight) | 85.00 | 55 |
| (mole %) | 96.07 | 69.09 |
| SAMPS (% by weight) | 15 | — |
| (mole %) | 3.93 | — |
| $CH_2=CCl_2$ (% by weight) | — | 45 |

| | -continued | |
|---|---|---|
| (mole %) | — | 30.91 |

The final viscose solution for spinning is obtained by mixing, after distillation, of unreacted monomers, 20 parts of the solution of polymer A, and 80 parts of polymer B in a conventional static or dynamic mixer as utilized for high viscosity polymer solutions, while the sequence of the distillation and mixing steps may be reversed. To a spinning solution obtained in this manner and containing approximately 25% of polymer, there is added a suspension of colloidal $Sb_2O_5$ having the following composition by weight:

| $Sb_2O_5$ | 6.75% |
|---|---|
| $H_2O$ | 30% |
| DMF | 63.25% |

This dispersion is obtained by adding 13.5 parts by weight of an acqueous colloidal dispersion at 50% of $Sb_2O_5$, to 86.5 parts by weight of a solution containing 26.9% water and 73.1% DMF.

Said dispersion is then added to the dope, which is heated to a temperature of about 75° C., by means a mechanical turbine type mixer. The dispersion is also heated to about 60° C. immediately before entering the mixer.

The yielded dope has the following composition by

| Polymer | 22.5% |
|---|---|
| $H_2O$ | 3% |
| $Sb_2O_5$ | 0.675% |
| DMF | 73.825% |

That viscose solution is spun in a conventional manner, in a 12°–13° C. bath and at a constant content of 50% $H_2O$ and 50% DMF, and the coagulated fiber is collected, washed with hot water, drawn to a draw ratio of 5.5, an dried, the whole in accordance with known techniques in the acrylic fiber art.

A fiber is obtained which has the following composition:

| ACN | 59.23% |
|---|---|
| Vinylidene chloride | 34.95% |
| SAMPS | 2.91% |
| $Sb_2O_5$ | 2.91% | and has a L.O.I. index of 30% oxygen.

While an exemplary embodiment of the invention has been described in the foregoing, the invention should not be construed as restricted to such an embodiment, since, as mentioned, it will be possible to employ either spinning viscose solutions of the same type as the one described, but having different percentages of components or utilizing different sulphonic compounds, or alternatively different spinning viscose solutions, provided that the spinning solvent used be DMF or dimethylacetamide.

We claim:

1. A method of preparing flame-resisting modacrylic fibers containing pentavalent antimony oxide, characterized in that the antimony oxide is suspended in a mixture of water and an organic solvent selected from dimethylformamide and dimethylacetamide wherein the percent by weight of water in the suspension ranges from 20% to 40%, and that the suspension is then mixed with the viscose solution of modacrylic polymeric material to be spun.

2. A method according to claim 1, characterized in that the organic solvent is the same as used in the viscose solution.

3. A method according to claim 1, characterized in that said antimony oxide is in particles of a size smaller than 100 millimicrons.

4. A method according to claim 1, characterized in that the mixing of the suspension with the viscose solution is carried out at temperatures in the 60° to 95° C. range.

5. A method according to claim 1, characterized in that the $Sb_2O_5$ suspension in water-organic solvent contains 2 to 12% by weight of $Sb_2O_5$.

6. A method according to claim 1, characterized in that the viscose solution of modacrylic polymeric material to be spun is a mixture of DMF solutions of binary copolymers, one of ACN and vinylidene chloride and the other of ACN and a sulphonic monomer.

* * * * *